United States Patent [19]

Brown

[11] 4,346,590
[45] Aug. 31, 1982

[54] GAIN STABILIZATION FOR RADIOACTIVITY WELL LOGGING APPARATUS

[75] Inventor: Winthrop K. Brown, Bellaire, Tex.

[73] Assignee: Texaco Inc., White Plains, N.Y.

[21] Appl. No.: 182,899

[22] Filed: Sep. 2, 1980

[51] Int. Cl.$^3$ ............................................. G01V 5/12
[52] U.S. Cl. .................................... 73/151; 250/256
[58] Field of Search ...................... 250/252, 253, 256; 73/151

[56] References Cited
U.S. PATENT DOCUMENTS 3,225,195  12/1965  Scherbatskoy ................. 250/252 X
3,916,685  11/1975  Paap et al. ..................... 250/262 X Primary Examiner—Jerry W. Myracle
Attorney, Agent, or Firm—Carl G. Ries; Robert A. Kulason; Ronald G. Gillespie

[57] ABSTRACT

An improved gain stabilization system for radioactivity well logging apparatus of the type having a scintillation crystal optically coupled to a photomultiplier, a light emitting diode driven by a pulser and furnishing scintillations to the photomultiplier located in a sonde resulting in a stabilization pulse which is provided to electronic circuitry at the surface for stabilization purposes. The improvement includes a temperature sensor located in the sonde and circuitry for maintaining the intensity of the light provided by the light emitting diode in response to the operation of the temperature sensor.

7 Claims, 3 Drawing Figures

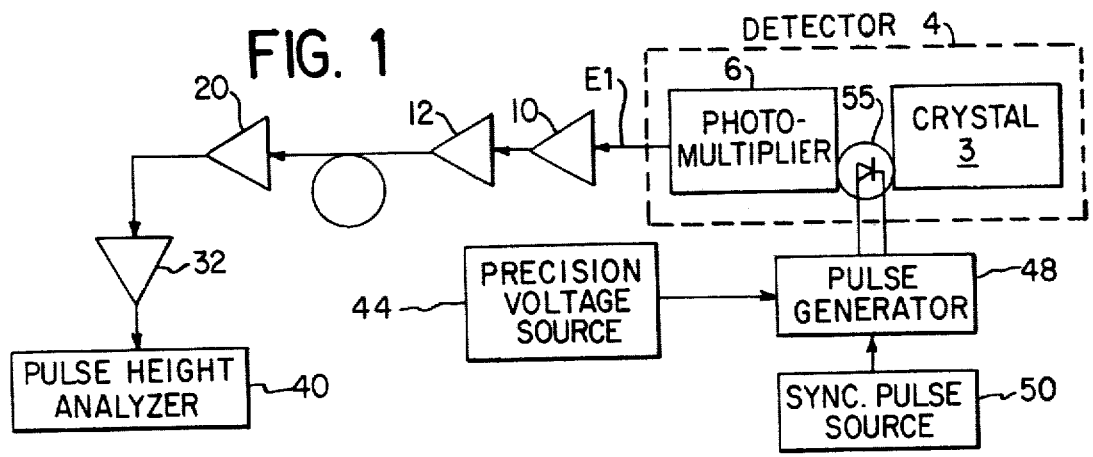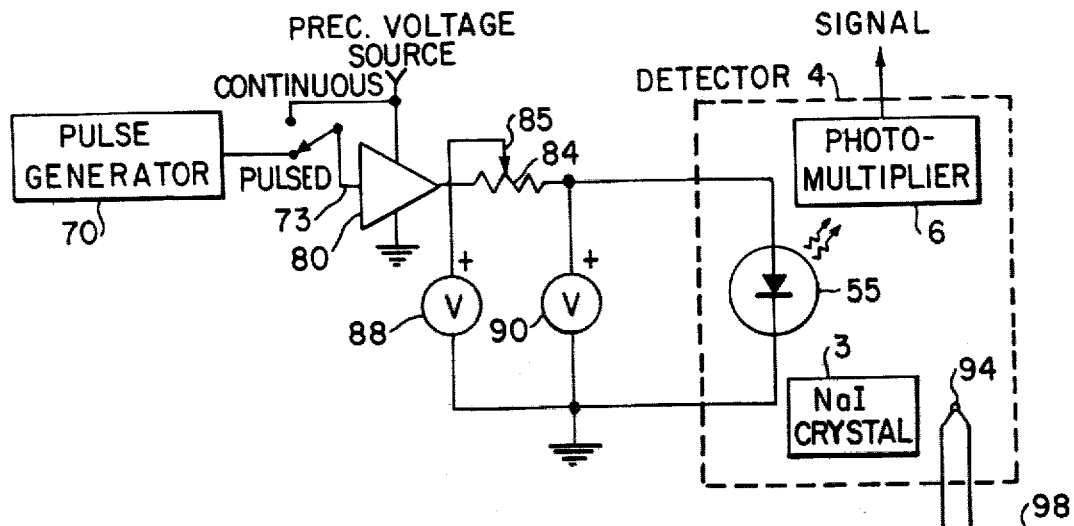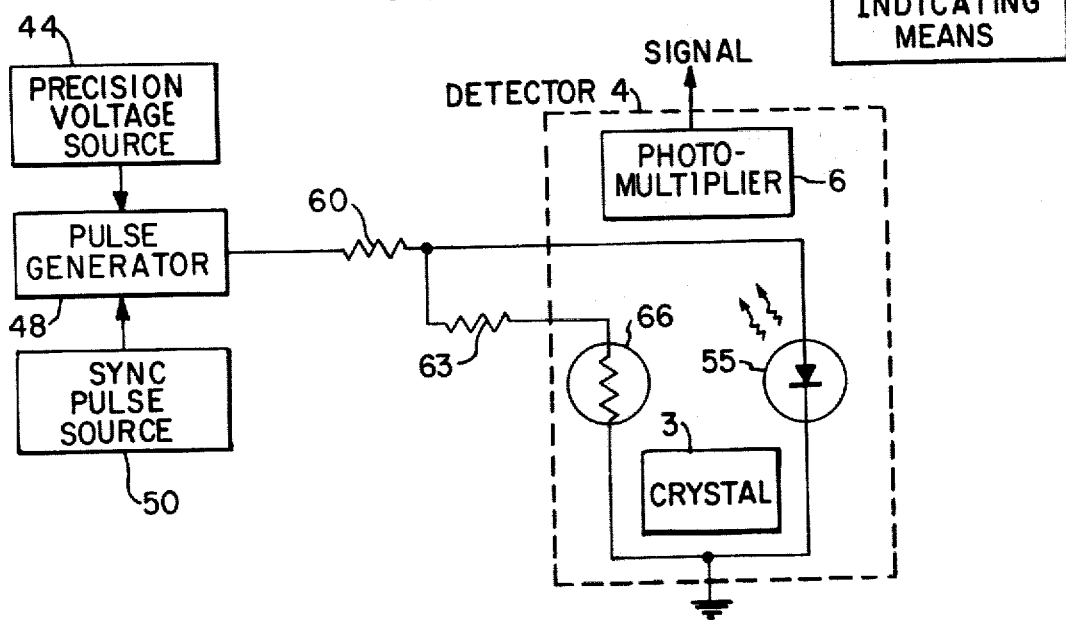

GAIN STABILIZATION FOR RADIOACTIVITY WELL LOGGING APPARATUS

BACKGROUND OF THE INVENTION

Field of the Invention

The present invention relates to well logging systems in general, and more particularly to gain stabilized well logging systems.

Summary of the Invention

An improved gain stabilization system for radioactivity well logging apparatus of the type having a scintillation crystal optically coupled to a photo multiplier in a sonde to detect gamma radiation in a borehole in an earth formation resulting from neutron bombardment of the earth formation, a light emitting diode driven by a pulser and furnishing scintillations to the photomultiplier. The improvement includes a temperature sensor controlling an electronic circuit which in turn maintains the intensity of the light emitted by the light emitting diode as the temperature experienced by the light emitting diode changes.

The objects and advantages of the invention will appear more fully hereinafter from a consideration of the detailed description which follows, taken together with the accompanying drawing, wherein one embodiment of the invention is illustrated by way of example. It is to be especially understood, however, that the drawings are for illustration purposes only and are not to be construed as defining the limits of the invention.

DESCRIPTION OF THE DRAWINGS

FIG. 1 is a simplified block diagram of a conventional type gain stabilized radioactivity well logging system.

FIG. 2 shows the downhole portion of the conventional system shown in FIG. 1, with the improvement of the present invention.

FIG. 3 is a partial schematic and a partial simplified block diagram of a system for determining resistance values of the resistors shown in FIG. 2.

DESCRIPTION OF THE INVENTION

A well logging system using gain stabilization as described and disclosed in U.S. application Ser. No. 921,394, filed July 3, 1978, now U.S. Pat. No. 4,220,851 assigned to Texaco Inc., assignee of the present invention, is shown in simplified form in FIG. 1 where a sodium iodide crystal 3 in a detector 4 located in a well logging tool (not shown) downhole in a borehole in an earth formation detects gamma radiation and provides pulses of light corresponding in intensity and frequency to the detected gamma radiation. A photomultiplier 6 in detector 4 converts the light pulses to electrical data pulses whose peak amplitude and frequency correspond to the detected gamma radiation and provides them to a preamplifier 10 which in turn provides data pulses to a cable driver 12. Cable driver 12 provides the data pulses to an electrical cable connecting the well logging tube to surface equipment. At the surface, the surface electronics includes an amplifier 20 receiving the data pulses from the cable and providing them to an automatic gain control amplifier 32 which in turn provides data pulses to a pulse height analyzer 40.

As it is well known in well logging practice, reference pulses of a known amplitude are generated downhole and provided to the surface electronics along the same path that the data pulses are provided so that automatic gain control amplifier 32 controls the height of the pulses being provided to pulse height analyzer 40 in accordance with the effects of the environment on the reference pulses.

The aforementioned U.S. application simplifies this and included another element of the data pulse path by providing a precision voltage source 44 in the well logging tool which provides a precision voltage to pulse generator 48. A sync pulse source 50 causes pulse generator 48 to provide a precision pulse to a light emitting diode 55 which in turn provided a light pulse causing photomultiplier 6 to provide an electrical reference pulse, thus, photomultiplier 6 is now included into signal path. However, even with that system, temperature changes downhole caused the intensity of the light from the light emitting diode to change, thereby affecting the reference pulses. The present invention controls the light intensity so as to provide highly stable reference pulses.

Referring now to FIG. 2, the signal to the correction circuit includes a resistor 60 connected in series with light emitting diode 55 which in turn is connected to ground. Another resistor 63 is connected in series with a positive temperature coefficient thermistor 66 which in turn is connected to ground. Thermistor 66 resistance value changes in accordance with temperature changes. The branch consisting of resistor 63 and thermistor 66 is connected in parallel with light emitting diode 55. The remainder of the circuitry shown in FIG. 2 is the same and operates in the same manner as that shown in FIG. 1.

In operation, as the temperature in the well logging tool changes, the resistivity of thermistor 66 changes, thereby changing the total resistance of that branch including resistor 63 and thermistor 66. The change in resistance of that branch controls the current flowing through the branch and hence the current flowing through light emitting diode 55 since the voltage is fixed. The current through light emitting diode 55 changes to maintain the intensity of the emitted light at its predetermined level so that amplitude of the reference pulse provided by the photomultiplier 6 does not change with the temperature change.

Referring to FIG. 3, resistance value for resistors 60, 63 are obtained by using a calibration circuit as shown. A pulse generator 70 provides pulses to a single pole, double throw switch 73. Switch 73 also has a precision voltage source, not shown, providing a voltage to another contact of switch 73 and to an amplifier 80. Switch 73 enables an operator to select between a pulsed mode of operation or a continuous mode of operation. The output of amplifier 80 is provided to a potentiometer 84 having a wiper arm 85 connected to a positive terminal of a voltmeter 88. The opposite end of potentiometer 84 is connected to another voltmeter 90 and to the light emitting diode 55. Detector 4 includes sodium iodide crystal 3 and photomultiplier 6. However, a temperature sensing device 94, located near crystal 3, provides a signal corresponding to temperature indicating means 98. It can be noted that voltmeters 88, 90 and thermistor 66 are connected to ground.

In calibration, potentiometer 84 is adjusted to give an acceptable energy ratio between the light emitting diode pulse and known energy peak. The resistance of potentiometer 84, the voltage readings on voltmeter 88 and 90 are used to determine the current flowing through potentiometer 84 which is substantially the same current flowing through light emitting diode 55 for the temperature T indicated in temperature indicating means 98. Detector 4 is cooled to a lower temperature T' which preferably along with temperature T bracket the expected operating temperature range for the well logging tool. Potentiometer 84 has its wiper arm 85 repositioned so that the same energy ratio for the first temperature is obtained. A new current for the light emitting diode 55 is then determined. Independent of this determination the resistive value of thermistor 66 is determined for temperatures T and T'.

The values of resistors 60 and 63 can now be determined from the following equations:

$$\begin{aligned}\text{Resistance Value of Resistor 63} = {}& [VD - VD' - (H)(VD) - (ID)(H)(RT') + \\ & (ID)(H)(RT) + (\Delta)(RT') - (\Delta)(RT) - \\ & [[VD' - VD + (H)(VD) + (ID)(H)(RT') - \\ & (ID)(H)(RT) - (\Delta)(RT') + (\Delta)(RT)]^2 - \\ & 4[(ID)(H) - \Delta](VD)[RT - RT + (H)(RT') - \\ & (H)(RT)]]^{\frac{1}{2}}]/[2[(ID)(H) - \Delta]] - RT.\end{aligned}$$

$H = (VD' - VD)/(V1 - VD)$, $\Delta = ID - ID'$,

VD, VD', ID, ID', RT, RT' and V1 correspond to the voltage across light emitting diode 55 at temperature T, the voltage across light emitting diode 55 at temperature T', light emitting diode 55 current at temperature T, light emitting diode 55 current at temperature T', the resistance of thermistor 66 at temperature T, the resistance of thermistor 66 at temperature T' and the voltage indicated by voltmeter 88, respectively.

$$\text{Resistance Value of Resistor 60} = (V1 - VD)/[VD/[(R63 + RT) + ID]$$

where R63 is the resistance value of resistor 63.

When the calculated values of resistors 60 and 63 and thermistor 66 are installed in the circuit, the detector 4 will maintain the same ratio between the light emitting diode pulses and the spectra over the temperature range used from compensation.

The present invention as hereinbefore described is an improved gain stabilization circuit for a well logging system. The present invention compensates for errors induced by temperature variation.

What is claimed is:

1. In a radioactive well logging apparatus which bombards earth formations and fluids in a vicinity of a well borehole with neutrons from a neutron source and detects resulting gamma radiation with a detector which includes a scintillation crystal for emitting flashes of light in response to the gamma radiation, a photomultiplier tube which provides voltage pulses in response to the flashes of light furnished, a light emitting diode, oscillator means for causing said light emitting dioded to emit light scintillations, and means for mounting said light emitting diode between the scintillation crystal and the photomultiplier tube, said means for mounting further optically coupling light scintillations from said light emitting diode for gain stabilization and said scintillation crystal to said multiplier tube for well logging, an improvement comprising:

temperature sensing means, and
   means connected between the light emitting diode and the oscillator means and to the temperature sensing means and being responsive to the temperature sensing means for maintaining the intensity of light emitted by the light emitting diode as the temperature changes.

2. The improvement as described in claim 1 in which the temperature sensing means is a thermistor whose resistance varies as a function of temperature.

3. An improvement as described in claim 2, in which the maintaining means includes
   a first resistor having a predetermined resistance value connecting the oscillator means to the light emitting diode, and
   a second resistor having a predetermined resistance value connected to the connection of the first resistor and to the light emitting diode and to the thermistor in a manner so that the second resistor and the thermistor are connected in series and they shunt the light emitting diode.

4. In a radioactive well logging apparatus which bombards earth formations and fluid in the vicinity of a well borehole with neutrons from a neutron source and detects resulting gamma radiation with a detector including a scintillation crystal for emitting flashes of light in response to the gamma radiation, a photomultiplier tube which provides voltage pulses in response to flashes of light furnished thereto, a gain stabilization apparatus comprising:
   a light emitting diode;
   oscillator means for causing said light emitting diode to emit light scintillations;
   means for mounting said light emitting diode between the scintillation crystal and the photomultiplier tube, said means for mounting further optically coupling lights scintillations from said light emitting diode for gain stabilization and said scintillation crystal to said photomultiplier tube for well logging, and
   means for maintaining the intensity of the light emitted by the light emitting diode regardless of temperature change.

5. Apparatus as described in claim 4 in which the light intensity maintaining means includes
   temperature sensing means for sensing the temperature in the vicinity of the light emitting diode, and
   network means connected between the light emitting diode and the oscillator means and to the temperature sensing means and being responsive to the temperature sensing means for maintaining the intensity of the light emitting diode as the temperature changes.

6. Apparatus as described in claim 5 in which the temperature sensing means is a thermistor whose resistance varies as a function of temperature.

7. Apparatus as described in claim 6 in which the network means includes
   a first resistor connecting the oscillator means to the light emitting diode, and
   a second resistor connected to the connection of the first resistor and the light emitting diode and to the thermistor in a manner so that the second resistor and the thermistor are connected in series to shunt the light emitting diode so that as the temperature changes the resistance of the thermistor changes affecting the current being provided to the light emitting diode to maintain the intensity of the light emitted by the light emitting diode.

* * * * *